UNITED STATES PATENT OFFICE.

LEO. MARKS, OF CINCINNATI, OHIO, ASSIGNOR TO LOUIS STERN, OF BOSTON, MASSACHUSETTS.

IMPROVEMENT IN COMPOUNDS FOR CLEANING CARPETS, &c.

Specification forming part of Letters Patent No. 110,481, dated December 27, 1870; reissue No. 4,860, dated April 9, 1872.

*To all persons to whom these presents shall come:*

Be it known that I, LEO. MARKS, of Cincinnati, in the county of Hamilton and State of Ohio, have invented a new and Improved Compound for the Cleansing of Carpets, &c., and that the following description is a full and exact specification of the same, wherein I have set forth the nature and principles of my said improved compound, together with what I claim and desire to secure by Letters Patent.

The present invention relates to a compound more especially intended for the cleansing and restoring of carpets, rugs, and other similar fabrics, but it is susceptible of use for the same purposes with other fabrics, such as, for instance, woolen cloths, &c., and therefore, while it is more particularly described herein in connection with carpets, it is not intended to limit its use thereto.

This improved compound is composed of the ingredients and in or about the proportions as follows: Ten (10) pounds of soap, by preference "Bell & Company's chemical soap," although other soap may be employed; thirteen (13) gallons of water, either warm or cold, or any other suitable medium for dissolving soap; three and one-half ($3\frac{1}{2}$) pounds of sal-soda; one-half ($\frac{1}{2}$) pound of ammonia; one-half ($\frac{1}{2}$) pound of alcohol.

These several ingredients above named are compounded as follows: Dissolve the soap in the water or other medium used suitable therefor, and to facilitate and expedite this dissolving of the soap slice or cut it up into fine particles; use a warm liquid, and thoroughly stir or agitate the liquid and soap. While the soap is being thus dissolved, add the three and one-half pounds of sal-soda, continuing to stir the whole, when pour gradually into the vessel containing the above the one-half pound of ammonia and the one-half pound of alcohol, the whole making, with an addition of water, about fifty gallons in quantity. To the compound of the materials made and prepared substantially as above described, it is best to add three (3) ounces of what is known in the market as "washing-crystal," although it is not absolutely necessary to employ the "washing crystal," as by practice and experience good results have been found to be produced with a compound made of simply the ingredients first above named; but with the addition of the "washing-crystal," because of its well-known cleansing quality, its preservative principle, and its great restorative action upon colors, when used upon fabrics most delicate in texture and color, the effect desired to be attained or produced by the use of the compound above described is found to be greatly facilitated and enhanced. Should the "washing-crystal" be employed it is best to add it to the solution of soap and water when the sal-soda is added; but it can be added either after the whole compound is prepared, or at the same time, or before or after either the ammonia or alcohol.

Whenever it is desired to clean a carpet with the improved compound embraced herein, the carpet should first be swept with a broom, so as to remove the surface-dust, lint, and other dirt. A good mode of using the compound is to provide two buckets, one containing the compound and the other water, and then with a brush wet with the compound rub well the carpet, the compound and the rubbing operation loosening the dirt and removing stains, grease-spots, &c., if any, in the carpet. Now rub the carpet with a wooden, rubber, or other suitable scraper, which collects and removes from the carpet the dirt loosened by the rubbing of the compound thereon, so that, then using a sponge saturated with water upon the carpet-surface, the entire removal of the dirt is secured, and by the use of a wiping-cloth the cleansing of the carpet then completed, the colors of the carpet coming out in all their original brightness. Proceed as above upon the different portions of the carpet-surface until the whole is cleansed. In lieu of using water alone, after the compound, a compound of water, alcohol, and ammonia may be employed, the alcohol and ammonia being first thoroughly mixed together in any suitable mode in or about the proportions of one-half pound of alcohol and one-half pound of ammonia, and then add this compound of alcohol and ammonia to about one gallon of water, warm water being preferable. The improved compound herein described has no injurious effect on the carpets; it serves to protect the carpets from ravages of moths and other vermin; it prevents carpets from becoming hard and stiff, and causes them to remain soft and pliable and elastic. Its use does not require the carpets to be removed or taken up from the floor, and with two buckets' full of the compound at least forty yards of carpet can be cleaned, the carpet being simply moistened or dampened with the compound, not saturated.

Although I have herein described and specified certain proportions in which the several essential elements or ingredients of the improved compound embraced herein may be used, I wish it to be distinctly understood that I do not intend to nor do I limit myself to the precise proportions stated, as they may be varied; but with a compound made substantially as herein described most satisfactory results have been secured.

The peculiar mode described of mixing the ingredients of the compound may be changed, as also the manner of using it varied somewhat from that herein stated; but the mode of preparation and manner of using aforesaid are found practical and efficient in the highest degree.

Having thus described my invention, what I claim, and desire to secure by Letters Patent, is—

A compound for cleaning carpets, &c., made of ingredients that are mixed together in or about the proportions substantially as described.

The above specification of my invention signed by me this 8th day of March, A. D. 1872.

LEO. MARKS.

Witnesses:
ALBERT W. BROWN,
EDWIN W. BROWN.